Nov. 25, 1952  L. L. BURNS, JR  2,619,604
MAGNETOSTRICTION DEVICE
Filed March 30, 1949
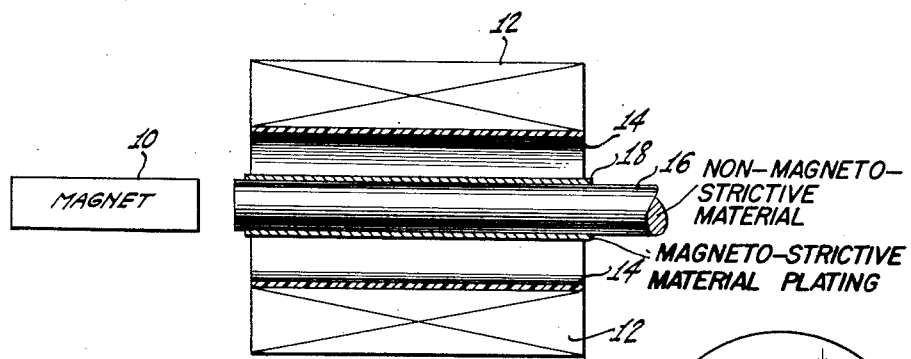
Fig. 1.
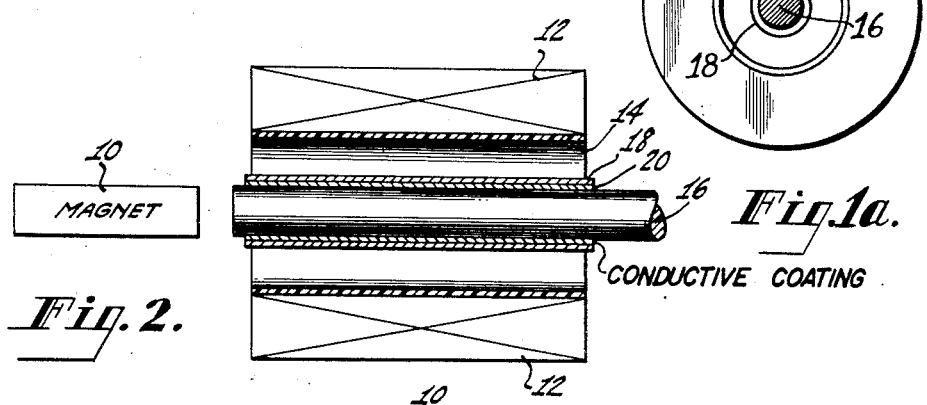
Fig. 1a.
Fig. 2.
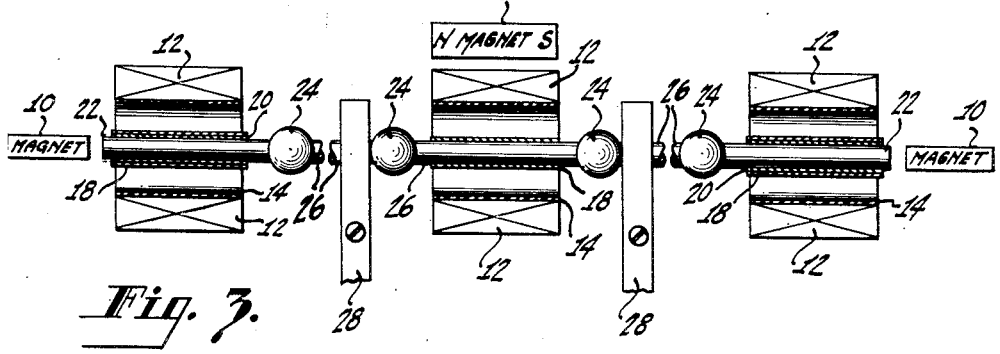
Fig. 3.
INVENTOR
LESLIE L. BURNS, JR.
BY
ATTORNEY Patented Nov. 25, 1952

2,619,604

UNITED STATES PATENT OFFICE 2,619,604

MAGNETOSTRICTION DEVICE

Leslie L. Burns, Jr., Princeton, N. J., assignor to Radio Corporation of America, a corporation of Delaware Application March 30, 1949, Serial No. 84,373

5 Claims. (Cl. 310—26)

This invention relates to vibrators and more particularly to an improvement in magnetostrictive vibrators.

In the construction of magnetostrictive devices it has been customary to make the magnetostrictive vibrator either out of a solid rod of magnetostrictive material, or of several joined sheets of magnetostrictive material, or of sheets of magnetostrictive material and non-magnetostrictive material. Another method of fabricating a magnetostrictive vibrator has been to form a hollow cylinder of mognetostrictive material and use a filler core of non-magnetostrictive material. These various fabrications have been made in attempts to obtain more efficient vibrators as well as vibrators in which the resonant frequency is stable and unaffected by temperature variations. Some of these various methods of vibrator fabrication are found described in Patents 1,882,397 through 1,882,400, issued on October 11, 1932, to George Washington Pierce.

It has been found that the comparative efficiency of mechanical bodies vibrating at resonance may be measured by comparing their "mechanical Q." The mechanical Q is analogous to electrical Q, being also know as a figure of merit, damping factor, or the number of cycles required for the amplitude of a voltage or motion to decrease to a given percentage of its original value.

More specifically, the mechanical Q is the number of cycles required for the amplitude of motion of a damped mechanical oscillator to reduce to $$\frac{1}{(e\pi)}$$

of its original value where:

$$Q = \left(\frac{w_0 m}{R_m}\right)$$

$w_0 = 2\pi v_0$ $v_0$ = the natural frequency of the oscillator $m$ = the mass of the oscillator $R_m$ = the resistance constant of the oscillator Similar to its electrical analogue, the higher the mechanical Q, the lower the response of the mechanical vibrator at frequencies other than the resonance frequency. It is therefore preferable from the standpoint of both high efficiency and frequency stability to utilize a vibrator having as high a Q as is obtainable.

In coupling a given, low Q material and a given high Q material together to make a composite vibrator, the relative masses of the materials determine the mechanical Q of the composite vibrator. Magnetostrictive material such as nickel has a relatively low Q. When it is combined with any high Q non-magnetostrictive material, in the manner taught in the prior art by joining sheets or combining a hollow cylinder and rod, the Q of the composite vibrator resulting is not much higher than that of the magnetostrictive material.

It is also oftentimes desirable in the construction of apparatus, such as mechanical filters, to determine the mechanical resonance frequency of the components of the filter. An ideal way of determining the resonance frequency is to vibrate the component under test by magnetostrictive forces since, with this method, no extraneous mass is added by any mechanical attachments for vibrating the component under test. Two problems are presented however. The first is the problem of making the component under test responsive to magnetostrictive forces. The second is the problem of making the component under test responsive to magnetostrictive forces without substantially altering the Q of the component under test.

It is therefore an object of this invention to provide a vibrator with a higher mechanical Q than heretofore obtainable.

It is a further object of this invention to provide a composite vibrator whose mechanical properties are substantially those of the core of said vibrator.

It is still a further object of this invention to provide a method whereby non-magnetostrictive materials are made responsive to the forces of magnetostriction.

I achieve these and other objects in accordance with my invention by selecting a core member having the desired mechanical properties and applying to it a relatively thin plating of a magnetostrictive material, or by applying to it a relative thin plating of a conductive metal and a relatively thin plating of a magnetostrictive material over said conductive metal plating.

The novel features of my invention, both as to its organization and method of operation, as well as additional objects and advantages thereof, will best be understood from the following description of several illustrative embodiments thereof, when read in connection with the accompanying drawings wherein:

Figures 1, 1a, and 2 show, partially in cross section, embodiments of my invention in a magnetostrictive vibrator system, with Figure 1a being an end view of Figure 1, and Figure 3 shows, partially in cross section a method of using my invention for tuning a mechanical filter.

In Figure 1 is shown a polarizing magnet 10 and a magnetostrictive driver coil 12 wound on a coil form 14. The function of the polarizing magnet 10 to establish a polarizing flux, and the function of the driver coil 12, when driven by a generator (not shown), to set up an alternating electromagnetic field, are well known in the art and are in no ways changed in the embodiments shown with my invention. A non-magnetostrictive core member, or body, 16, having desired mechanical properties such as a high Q, has applied, to the surface area affected by the electromagnetic field from the driver coil 12, a plating of a magnetostrictive material 18 shown in cross section. The plating of magnetostrictive material may be applied by electroplating, brushing, evaporation or the like. I have found however, that the method of plating which produces the least porous coating gives the best magnetostrictive results. Figure 1a is an end view of Figure 1 and has the similar parts thereof identified with similar reference numerals.

The magnetostrictive drive on the core member, or body, 16, as a result of the magnetostrictive plating 18, is substantially as efficient as if the core body were made of a magnetostrictive material throughout, or was a magnetostrictive cylinder of substantial thickness. However, due to the relatively small mass of magnetostrictive material used, the mechanical properties of the core body are substantially unaffected. For instance, I have found that approximately a 1 mil coating of nickel, plated on a non-magnetostrictive core, is ample to produce an efficient vibrator in which the mechanical qualities of the core are substantially unaffected. It is to be understood that the magnetostrictive plating is applied to the surface area of the core member 16 affected by the electromagnetic field from the driver coil 12. The magnetostrictive plating may be applied to other areas of the core member 16 as well, such as areas along the core member which extend outside of the effective zone of the electromagnetic field or to the vibrator end areas, but, as more magnetostrictive material is applied its mass begins to approach a value where it may affect the mechanical properties of the core member.

Figure 2 shows another embodiment of my invention which operates more efficiently than the embodiment shown in Figure 1. The core body 16 has a plating of a highly conductive metal 20 applied to the area of the core body 16 affected by the electromagnetic field. Over this conductive plating 20 is applied the plating of the magnetostrictive material 18. Here also, both platings may be applied by successive electroplating, evaporation or brushing. However, less porous platings produce a more efficient magnetostrictive drive. It is believed that the effect of the conductive coating 20 is to reduce the eddy current loss circulating in the plane of the magnetostrictive coating by constraining the electromagnetic flux to flow along the coating rather than through it.

By means of my invention I have been able to make non-magnetostrictive materials, such as aluminum, glass or Phosphor bronze, having widely varying mechanical properties responsive to magnetostrictive forces. By using a core member of aluminum, which has a Q of approximately 4,000, and using silver or copper as an undercoating with nickel as the coating of magnetostrictive material, I have made a magnetostrictive vibrator having an extremely sharp resonance curve.

A magnetostrictive frequency standard may be fabricated by choosing the core body to have as low a temperature coefficient as possible, or as high a Q, without regard to its magnetostrictive qualities and then applying a magnetostrictive plating in the manner described herein.

A simple and efficient magnetostrictive drive or pickoff may be made for mechanical filters by applying a magnetostrictive plating of nickel or a thin coating of magnetostrictive ferrites such as ferro-stinel by sintering or brushing a thin coating of an adhesive mixture thereof, equivalent to a plating, onto the input and output elements of the mechanical filter. The filter characteristic impedance and pass-band characteristic are thereby substantially unaffected.

The resonant frequency of an element or resonator of a mechanical filter, which is not of magnetostrictive material, can be determined by plating it with magnetostrictive material and then driving it with an alternating electromagnetic field until resonance is reached, using suitable detecting instruments to determine the point of resonance. The element can be tuned to have desired resonance frequency by filing or adding weight to it, the resonance point being determined by an increase in the apparent resistance of the driver coil at the resonant point of the element.

Figure 3 shows an example of the use of my invention to permit drive and pick-off from one type of mechanical filter as well as tuning of the resonators of the mechanical filter. The mechanical filter consists of several alternate resonator or rod sections 26 and ball sections 24 with a section on either end known as an end filter section 22. The end filter sections 22 have the conductive metal plating 20 with the magnetostrictive material plating 18 over it. These end sections operate in similar fashion as was described for Figure 2. One of the ends may therefore be driven magnetostrictively and a pick-off may be taken from the other end.

An element or resonator 26 of the filter is also shown being tuned for resonance. The resonator 26 is mechanically isolated from adjacent filter sections by means of the rigid clamps 28. Stated otherwise, the effect of these clamps is to damp any vibrations that may be transmitted through the ball sections 24 on either side of the resonator 26 being tuned to the adjoining resonators. The clamps also serve to prevent any oscillations, from the adjoining resonator sections, from being applied to the resonator. Effectively, therefore, the resonator being tuned vibrates substantially as if it were isolated from the remainder of the filter on either side of the clamps. The resonator 26 may be plated with a coating of magnetostrictive material 18, as shown, since for the purpose of tuning efficiency of drive is not a factor. If desired, however, a highly conductive coating followed by the magnetostrictive plating may be applied as is shown and described for Figure 2. A coil 12 is next placed around the resonator being tuned to provide the electromagnetic driving field. The polarizing magnet 10 is placed proximal to the resonator to provide the required polarizing magnetic field. The coil 12 and magnet 10 are similar to the ones previously shown and described but differ only in that they are removable and are removed after a filter section is tuned. The resonant frequency can then be determined as above indicated and the resonator can be tuned to resonate at a desired frequency by suitable means. Each resonator can be similarly treated and tuned until the entire filter is tuned.

It can therefore be seen that my invention is utilizable wherever it is desired to make magnetostrictively responsive a material which is substantially non-magnetostrictive, while the mechanical properties of the material are substantially unaffected. Although some modifications of my invention have been shown, it will be apparent to those skilled in the art that many other variations and embodiments thereof are possible. I therefore desire that the foregoing shall be taken merely as illustrative and not in a limiting sense.

What I claim is:

1. In a magnetostrictive vibrator a composite core, said core comprising a core body having a desired mechanical Q, a plating of a highly conductive metal on said core body, and a plating of magnetostrictive material on said conductive metal whereby the mechanical Q of said vibrator are substantially those of said core body.

2. A magnetostrictive vibrator comprising exciting means and a composite core, said core consisting of a core body of aluminum, a plating of copper thereon, and a plating of nickel on said copper plating.

3. A method of tuning a substantially non-magnetostrictive member to mechanical resonance at a desired frequency comprising plating magnetostrictive material on said member, applying to said member a magnetostrictive driving force at the desired resonant frequency, and varying the mass of said member until it resonates at said resonant frequency.

4. A method of tuning the resonators of a substantially non-magnetostrictive mechanical filter comprising plating magnetostrictive material on said resonator, isolating said resonator, applying a magnetostrictive driving force at the desired resonant frequency to said resonator, and varying the mass of said member until it resonates at the desired frequency.

5. In a magnetostrictive vibrator system, a composite core comprising a core body of aluminum, a plating of copper thereon, and a plating of nickel on said copper plating.

LESLIE L. BURNS, JR.

REFERENCES CITED

The following references are of record in the file of this patent:

UNITED STATES PATENTS

| Number | Name | Date |
|---|---|---|
| 1,637,033 | Basch | July 26, 1927 |
| 1,882,393 | Pierce | Oct. 11, 1932 |
| 1,882,398 | Pierce | Oct. 11, 1932 |
| 2,551,848 | Parker | May 8, 1951 |